(12) United States Patent
Banchieri et al.

(10) Patent No.: US 11,796,111 B2
(45) Date of Patent: Oct. 24, 2023

(54) FLUID TRANSPORT AND DISTRIBUTION MANIFOLD

(71) Applicant: Sunflower Therapeutics, PBC, Hingham, MA (US)

(72) Inventors: Andrew Banchieri, Fremont, CA (US); David Weiser, Watertown, MA (US); Brian Hauser, Campbell, CA (US)

(73) Assignee: Sunflower Therapeutics, PBC, Hingham, MA (US)

( * ) Notice: Subject to any disclaimer, the term of this patent is extended or adjusted under 35 U.S.C. 154(b) by 0 days.

(21) Appl. No.: 17/468,114

(22) Filed: Sep. 7, 2021

(65) Prior Publication Data

US 2022/0074533 A1    Mar. 10, 2022

Related U.S. Application Data

(60) Provisional application No. 63/075,447, filed on Sep. 8, 2020.

(51) Int. Cl.
| | | |
|---|---|---|
| *F16L 41/03* | (2006.01) | |
| *B01L 3/00* | (2006.01) | |
| *F16K 11/072* | (2006.01) | |
| *F16K 99/00* | (2006.01) | |

(52) U.S. Cl.
CPC .......... *F16L 41/03* (2013.01); *B01L 3/50273* (2013.01); *F16K 11/072* (2013.01); *B01L 2300/0819* (2013.01); *B01L 2300/123* (2013.01); *F16K 2099/0084* (2013.01); *F16L 2201/10* (2013.01)

(58) Field of Classification Search
CPC .......... B01L 3/50273; B01L 2300/123; B01L 2300/0819; Y10T 137/87249; F16K 2099/0084; F16K 11/072; F16L 41/03
See application file for complete search history.

(56) References Cited

U.S. PATENT DOCUMENTS

| | | | |
|---|---|---|---|
| 3,012,408 A * | 12/1961 | Perkins | .................... F25J 5/005 62/430 |
| 5,626,172 A | 5/1997 | Schumacher et al. | |
| 5,941,635 A | 8/1999 | Stewart | |
| 7,378,280 B2 | 5/2008 | Chou | |
| 7,445,926 B2 | 11/2008 | Grover et al. | |
| 7,736,050 B2 | 6/2010 | Kim et al. | |

(Continued)

FOREIGN PATENT DOCUMENTS

| | | |
|---|---|---|
| CA | 2807564 A1 | 1/2014 |
| CA | 2807564 C | 1/2014 |

(Continued)

OTHER PUBLICATIONS

International Search Report and the Written Opinion for corresponding International Patent Applicant No. PCT/US2021/049256 dated Dec. 28, 2021, 6 pages.

(Continued)

*Primary Examiner* — Atif H Chaudry
(74) *Attorney, Agent, or Firm* — Morgan, Lewis & Bockius LLP

(57) ABSTRACT

A structured assembly of perpendicular, interwoven fluidic conduits permits connections between conduits to be readily (and in some cases visibly) established, thereby providing operational convenience and amenability to automated means of validation or verification.

20 Claims, 2 Drawing Sheets

(56) References Cited

U.S. PATENT DOCUMENTS

| | | |
|---|---|---|
| 7,815,868 B1 | 10/2010 | Jones et al. |
| 9,696,097 B2 | 7/2017 | Bera et al. |
| 10,301,200 B2 | 5/2019 | Liang |
| 11,027,108 B2 | 6/2021 | Perdue et al. |
| 2005/0019794 A1* | 1/2005 | Nassef ............... C30B 7/00 435/6.11 |
| 2009/0291435 A1* | 11/2009 | Unger ............... C12Q 1/686 435/6.19 |
| 2010/0200475 A1 | 8/2010 | Kwon |
| 2018/0266608 A1 | 9/2018 | Rupkalvis et al. |
| 2019/0113166 A1 | 4/2019 | Zoellner et al. |

FOREIGN PATENT DOCUMENTS

| | | |
|---|---|---|
| EP | 0622115 B1 | 10/1998 |
| WO | 2018132512 A1 | 7/2018 |
| WO | 2018183848 A1 | 10/2018 |
| WO | 2018183971 A1 | 10/2018 |
| WO | 2018183972 A2 | 10/2018 |
| WO | 2019060638 A1 | 3/2019 |
| WO | 2019099954 A1 | 5/2019 |
| WO | 2019147310 A2 | 8/2019 |

OTHER PUBLICATIONS

Crowell et al., "On-demand manufacturing of clinical quality biopharmaceuticals", Nature Biotechnology, accepted Aug. 27, 2018; published online Oct. 1, 2018; http://dx.doi.org/10.1038/nbt.4262, 15 pages.

Matthews et al., "Development of a general defined medium for Pichia pastoris", Biotechnology and Bioengineering. 2018;115:103-113.

* cited by examiner

FLUID TRANSPORT AND DISTRIBUTION MANIFOLD

CROSS-REFERENCE TO RELATED APPLICATION

This application claims priority to and the benefit of, and incorporates herein by reference in its entirety, U.S. Ser. No. 63/075,447, filed on Sep. 8, 2020, the entire disclosure of which is hereby incorporated by reference.

FIELD OF THE INVENTION

The present invention relates, generally, to fluid transport and distribution in biological production processes.

BACKGROUND

Biopharmaceuticals and vaccines are commonly produced or manufactured using a series of operations intended to express, recover, and stabilize proteins or other pharmaceutical ingredients as part of a manufacturing process. These operations involve the delivery, transfer and disposal of one or more fluid media and buffers comprising combinations of salts, chemicals, and other substances intended to support specific steps in the production process. Examples of such operations include cell cultivation or fermentation, buffer exchange, chromatography, concentration, precipitation, and crystallization. For biopharmaceuticals and vaccines, the assurance of aseptic transfer and processing is also important.

Common means of storing and transferring these fluids in a single operation or in multiple operations involve conduits or pipes to deliver the fluids from one location, such as a storage tank, to another. These conduits for transfer can be made of stainless steel or other similar inert metals that can be cleaned to remove residual materials by a number of methods including exposure to steam, chemicals, heat, or combinations. Any single operation among the plurality of steps required for manufacturing can require transfer of different fluids to achieve the completion of the process. For chromatographic operations using resins to recover pharmaceutical ingredients or to remove impurities from the fluids, the number of buffers used may range from 4 to 10 fluids. A typical manufacturing process may include 3-6 or more steps of this type. In total, the unique number of fluid-carrying conduits can range from two to 20 to 100 or more. Similarly, a multiplicity of buffers or fluids may be used for non-chromatographic separation operations such as tangential flow filtration, ultrafiltration, diafiltration, membrane separations or other filter methods common in the industry.

Disposable fluidic conduits can reduce the chemical waste required for cleaning fixed conduits between operations, improve the assurance of aseptic operations, and reduce the time required to build new manufacturing sites or processes for new pharmaceutical ingredients. These disposable fluidic conduits often comprise biocompatible materials such as silicone tubing or other plastics. The conduits often are customized in length and terminal connections to connect different equipment in the process. The connections may include direct connections to other disposable components such as bags or containers or adaptable connectors designed to allow aseptic connection to another conduit. In this way, a set of assembled conduits can be connected to allow for the connectivity of the plurality of fluids and transfers required for one or more operations of bioprocessing.

The components needed for a particular application may include tubes, connectors, bags, valves and the like, and these basic elements may be assembled into complex fluid-transfer systems as needed to effect the various operational stages of the application. Because the components tend to be so simple and versatile, the assembled systems can become ungainly and difficult to reproduce. An operator may be required to follow detailed instructions to assemble a kit of basic parts into a complex functional apparatus. Errors in connecting the components or sub-assemblies of components can degrade operation and render the system unusable for drug manufacturing or other production lines requiring high levels of assurance. Hence, there is a need for flexible, scalable, intermediate-level fluid-transfer components that are versatile enough to serve in a broad range of deployments, and which will also help reduce or minimize operator error.

SUMMARY

Embodiments of the present invention utilize a structured assembly of fluidic conduits that permits connections between conduits to be readily (and in some cases visibly) established, thereby providing operational convenience and amenability to automated means of validation or verification.

Accordingly, in a first aspect, the invention relates to fluid transport and distribution manifold comprising, in various embodiments, a support; a first plurality of parallel fluid conduits passing through the support; and a second plurality of parallel fluid conduits passing through the support perpendicular to, and interwoven with, the first fluid conduits; at least some of the second fluid conduits are selectably fluidly connected to one or more of the first plurality of fluid conduits. The first and second conduits may be interlaced as warp and weft.

In various embodiments, the manifold further comprises a multiport valve head, and the first plurality of parallel fluid conduits terminate at the valve head. Fluid connections between the first and second fluid conduits may be established by permanent connections therebetween or by adjustable transfer valves. The transfer valves, which may be check valves, can be manually or electronically adjustable. For example, the manifold may further comprise circuitry for receiving user commands and, in response thereto, electronically adjusting at least one of the transfer valves. Such circuitry may comprise a wired and/or wireless network interface for receiving the user commands, e.g., specifying a transfer valve and an opening level thereof.

In various embodiments, each of the first conduits is connected, via separate transfer valves, to all of the second conduits. The support may include a rigid frame for retaining the first and second conduits in the perpendicular, interwoven configuration. For example, the support may include channels of differing depths for receiving the conduits and enforcing the perpendicular, interwoven configuration. In some embodiments the manifold includes, integral with the support, a first plurality of connectable ports each affording fluid access to a free end of one of the first conduits. The may include, integral with the support, second and third pluralities of connectable ports, each of the second connectable ports affording fluid access to a first end of one of the second conduits and each of the third connectable ports affording fluid access to a second end of one of the second conduits.

In another aspect, the invention pertains to a method of fluid transport comprising, in various embodiments, the steps of interweaving first and second pluralities of parallel fluid conduits, the first and second pluralities of fluid conduits being substantially perpendicular to each other; fluidly connecting each of at least some of the second fluid conduits to one or more of the first plurality of fluid conduits; and causing fluid to flow from at least some of the first fluid conduits into second fluid conduits to which they are fluidly connected. The fluid connections may be permanent or adjustable and valved.

As used herein, the term "approximately" means±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing and the following detailed description will be more readily understood when taken in conjunction with the drawings, in which.

DETAILED DESCRIPTION

Figure 1A:
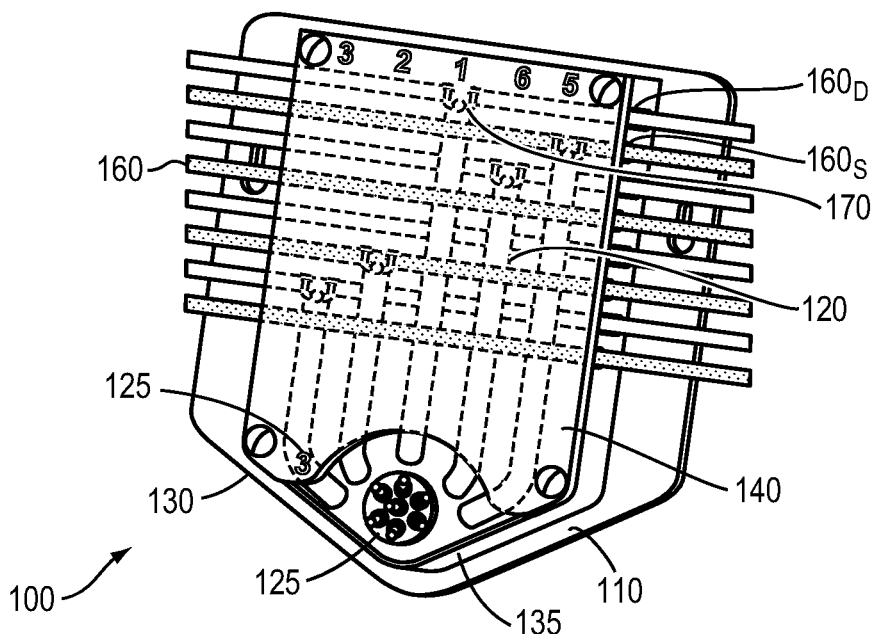
FIG. 1A is a perspective, partially transparent view of a distribution manifold in accordance with embodiments of the invention.
Figure 1B:
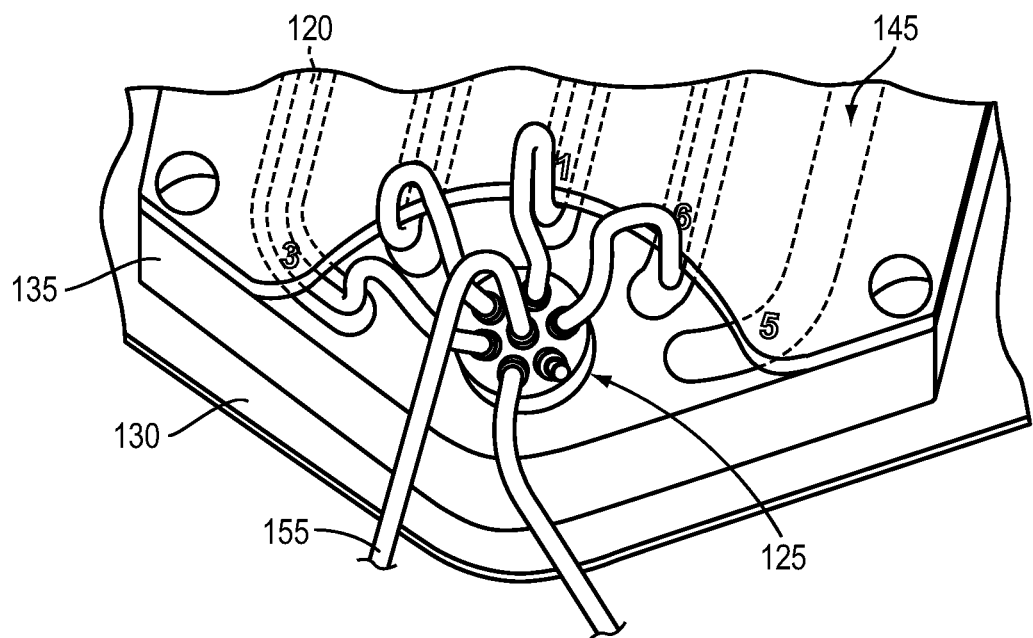
FIG. 1B is an enlarged view of the rotary valve shown in FIG. 1A, and including the fluidic connections made for operation.
Figure 2:
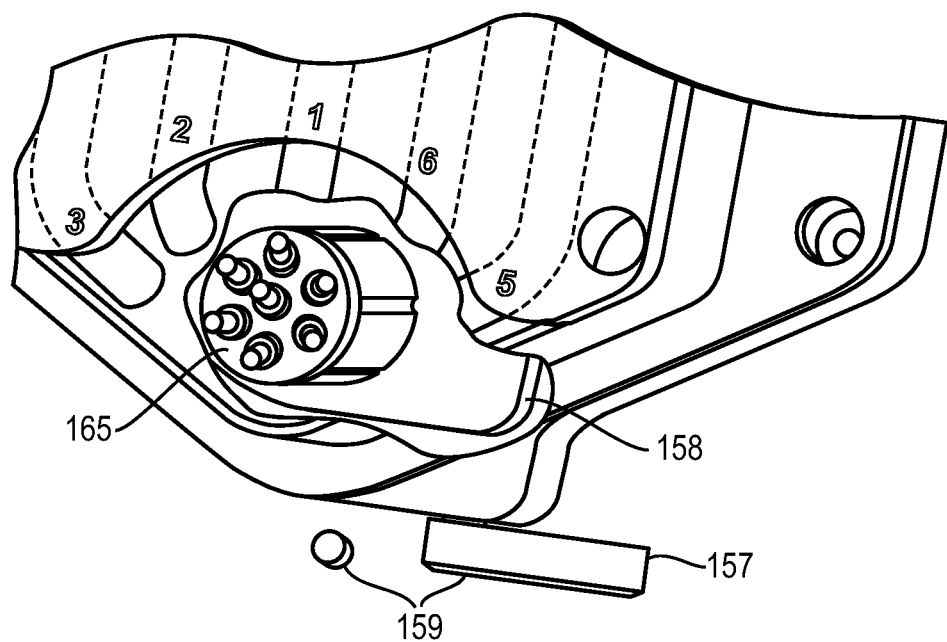
FIG. 2 is another enlarged view of the rotary e shown in FIGS. 1A and 1B, with additional mechanical features indicated.

Refer first to FIGS. 1A and 1B, which illustrate a representative fluid transport and distribution manifold 100. The manifold 100 includes a support 110, a first plurality of (vertical) parallel fluid conduits representatively indicated at 120 that terminate at a multiport valve head 125. The support 110 includes a backplate 130, a raised platform 135, and a cover plate 140 that protects the fluid conduits but leaves the valve head 125 exposed and accessible. The cover plate 140 may be secured to the raised platform 135 by screws (as illustrated), heat-sealing, glue or other means of fastening, and may be transparent to allow for leak detection and verification of proper assembly. The terminal portions of the fluid conduits 120 seat within recessed channels 145 and pass under the edge of the cover plate 140, each extending in a loop to connect to a port of the valve head 125. The rotary valve head 125 facilitates selectable fluid connection between an outlet or inlet line 155 and one of the fluid conduits 120. As shown in FIG. 2, the cover plate 140 may include identifiers (e.g., numbers, letters or machine-readable markings) specifying the position on the rotary valve head 125 to which the indicated conduit 120 corresponds. As shown in FIG. 2, the front face of the rotary valve head 125 is rotated until the desired conduit is brought into the home position, fluidically connecting it to the line 155. The looped terminal portions of the conduits 120 extend to accommodate this rotation without stress. Optionally, a locking lever 157 may be coupled to a Belleville spring stack 158 to rotationally lock the rotary valve head 125 in a selected position. A pair of lever stops 159 ensure finger clearance.

A second plurality of (horizontal) parallel fluid conduits 160 passes through the support 110 perpendicular to, and interwoven with, the first fluid conduits 120. Interweaving can take various forms. In FIG. 1A, successive conduits 140 pass behind and in front of the conduits 120 in an alternating fashion. This is achieved by seating the conduits 160 in channels having alternating deep (e.g., conduit 160) and shallow (e.g., conduit 160s) depths. The channels 145 through which the fluid conduits 120 pass have an intermediate depth. In this configuration, half of the fluid conduits 160 lie above the perpendicular conduits 120 and half lie below. Alternatively, the conduits 120 may form a warp and the conduits 160 may be individually woven (i.e., interlaced) therethrough in a weft, or the conduits 160 may form a warp and the conduits 120 may be individually woven therethrough in a weft—i.e., an x-y weave. More elaborate "stitching" patterns are possible, e.g., a set of two weaves interlaced and rotated 90° relative to one another (i.e., additional lines on the diagonals).

Connections may be made as desired between vertical and horizontal conduits; each horizontal conduit may be connected to one or more vertical conduits, or to no other conduits, and similarly, each vertical conduit may be connected to one or more horizontal conduits, or to no other conduits. For example, the horizontal conduits 160 may deliver various analytical reagents and the vertical conduits 120 may deliver samples to be tested. Each sample may require mixing with one or multiple reagents delivered via individual conduits 140. A conduit may or may not terminate at its connection with another conduit.

Fluidic connections between vertical and horizontal conduits may be permanent, temporary, or programmable. The interwoven arrangement of conduits affords room for adjacent connections to be established without crowding or interference. In some embodiments, connections are made by permanent connectors that, for example, pierce both conduits and establish fluid-tight connections between them. Alternatively, as shown in FIG. 1A, connections may be made using T-connectors 170, which terminate the associated vertical conduit 120 and create a fluid path to the lumen of a horizontal conduit 160. These connectors may be installed in any desired number and configuration, and may include check valves that, for example, permit entry of reagent into a sample-containing conduit but prevent reverse travel of sample into the reagent conduit (which may supply other sample conduits).

Figure 3:
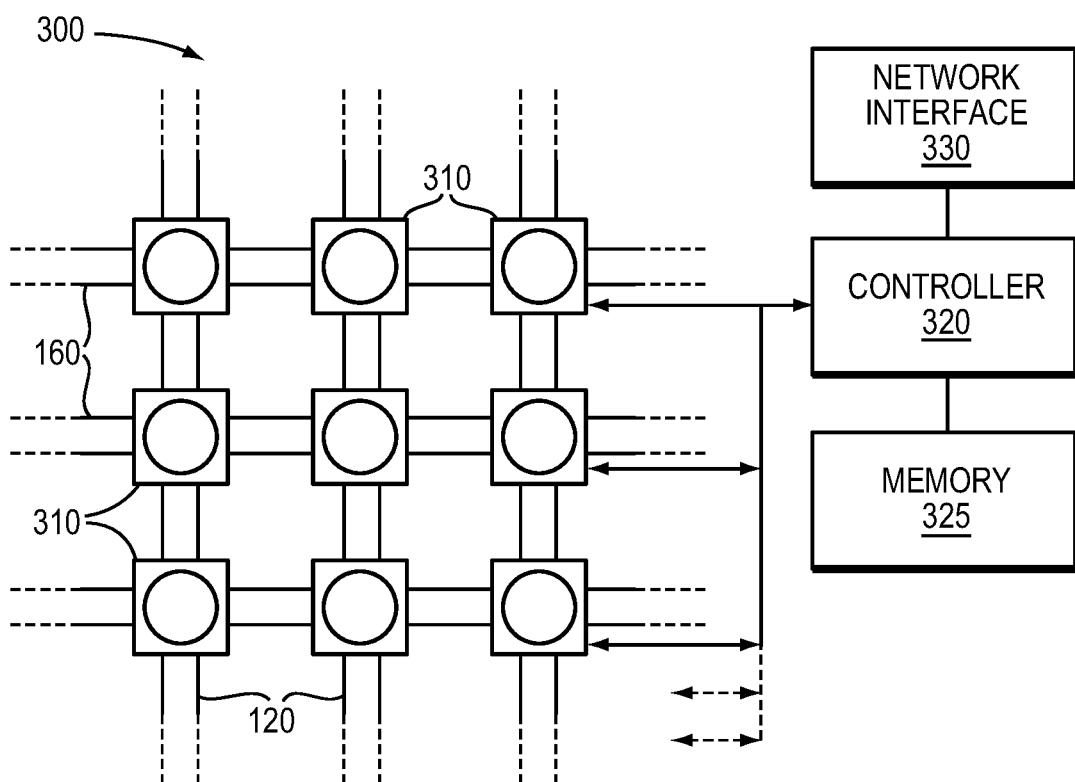
FIG. 3 schematically illustrates a programmable version of the distribution manifold shown in FIG. 1A.

In some embodiments, the connections are established by adjustable transfer valves. For example, in the system 300 shown in FIG. 3, a transfer valve 310 is placed at some or all conduit intersections and may be selectively activated, by a controller 320, to achieve a desired pattern of connections. In particular, these valves 310 may be manually and/or electrically adjustable by the controller 320, allowing the transfer rate to be selectable from no flow at all to a maximum flow between conduits. In one implementation, the valves are electrically actuable and the pattern of desired valve actuation states is communicated to the controller 320 and stored in an associated nonvolatile (e.g., Flash) memory 325. For example, the controller may have a conventional wireless (or wired) interface 330 and receive commands from a user via, for example, a phone or tablet. These commands, entered via an interface or communicated as a graphical pattern, dictate the state (i.e., the degree of opening) of each controlled valve 310. The controller sends signals to the valves 310 to place them electromechanically in the programmed state, which is persistent. The valves 310 may include flow sensors whose outputs are periodically sensed by the controller 320 to set the valve initially and thereafter ensure conformance with the stored actuation pattern; any detected deviation may be corrected by appropriate control signals sent to the deviant valve. The controller 320 and memory 325 may be located, for example, between the backplate 130 and the raised platform 135. Suitable electromechanically actuable valves are conventional and readily available.

The fluid conduits 120 terminate at the valve head 130, as shown. The opposite ends of some or all of the conduits 120 may also terminate at the edge of the manifold 100, e.g., in luer locks or similar fittings allowing fluid-tight connections to be established. Some or all of the fluid conduits 160 may similarly terminate, at one or both ends, at the edge of the manifold 100. It should be noted that the valve head 125 is optional. In some embodiments, the outlets of all of the fluid conduits 120 exit the manifold 100, i.e., a single conduit 120 is not selected. The manifold acts to establish selectable connections among the intersecting conduits.

The manifold 100 may include features allowing attachment to another component used in manufacturing. These features may include holes, hangers, velcro, or other attachment elements. In some embodiments, the manifold 100 can mount onto a custom holding element on a receiving component for mounting. In some cases, this feature includes a conventional locking mechanism to hold the array in place after attachment. In some cases, this element is connected to an electrical or mechanical sensor.

In embodiments where connections among conduits are made manually, the pattern of connections is desirably visible through the cover plate 140 and may be recorded by a digital camera, scanner, video recording device or other means of capturing images and interpreted by a computer vision or other recognition system to categorize the manifold 100 among a plurality of possible types, each, for example, corresponding to a particular application. This simplifies manufacture and distribution, and also allows for verification when a manifold is installed in production. The sensed pattern may be communicated to the controller 320 of a programmable embodiment 300 to replicate the pattern.

Alternatively or in addition, markings may be placed on the manifold 100 to indicate the orientation of the structured array for installation or, once again, to assure the identity of the assembly. In some instances, the manifold 100 also includes (or may receive) a RFID or other passive signaling device. In some instances, the manifold 100 is marked with a barcode. In some embodiments, the shape of the manifold and surrounding support 110 is associated with the number and placement of conduits.

The controller 320 may be implemented in hardware, software or a combination of the two. For embodiments in which the functions are provided as one or more software programs, the programs may be written in any of a number of high level languages such as PYTHON, PASCAL, JAVA, C, C++, C#, BASIC, various scripting languages, and/or HTML. Additionally, the software can be implemented in an assembly language directed to the microprocessor resident on a target computer; for example, the software may be implemented in Intel 80x86 assembly language. The software may be embodied on an article of manufacture including, but not limited to, a PROM, an EPROM, EEPROM, or field-programmable gate array (FPGA). Embodiments using hardware circuitry may be implemented using, for example, one or more FPGA, CPLD or ASIC processors, or a conventional microprocessor or microcontroller.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A fluid transport and distribution manifold comprising:
   a support;
   a first plurality of parallel fluid conduits passing through the support;
   a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits; and
   a multiport valve head, the first plurality of parallel fluid conduits terminating at the valve head.

2. The manifold of claim 1, wherein fluid connections between fluid conduits in the first and second pluralities of parallel fluid conduits are established by permanent connections therebetween.

3. The manifold of claim 1, wherein fluid connections between fluid conduits in the first and second pluralities of parallel fluid conduits are established by adjustable transfer valves.

4. The manifold of claim 3, wherein the transfer valves are manually adjustable.

5. A fluid transport and distribution manifold comprising:
   a support;
   a first plurality of parallel fluid conduits passing through the support; and
   a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits,
   wherein fluid connections between fluid conduits in the first and second pluralities of parallel fluid conduits are established by adjustable transfer valves, and wherein the transfer valves are check valves.

6. The manifold of claim 3, wherein the transfer valves are electronically adjustable and further comprising circuitry for receiving user commands and, in response thereto, electronically adjusting at least one of the transfer valves.

7. The manifold of claim 6, wherein the circuitry comprises a network interface for receiving the user commands.

8. The manifold of claim 7, wherein the network interface is wired.

9. The manifold of claim 7, wherein the network interface is wireless.

10. The manifold of claim 6, wherein the user commands each specify a transfer valve and an opening level thereof.

11. The manifold of claim 3, wherein each of the first plurality of parallel fluid conduits is connected, via separate transfer valves, to all of the second plurality of parallel fluid conduits.

12. The manifold of claim 1, wherein the support includes channels of differing depths for receiving the first and second pluralities of parallel fluid conduits and enforcing the perpendicular, interwoven configuration.

13. A fluid transport and distribution manifold comprising:
 a support;
 a first plurality of parallel fluid conduits passing through the support; and
 a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits,
 wherein the support comprises a rigid frame for retaining the first and second conduits in the perpendicular, interwoven configuration.

14. The manifold of claim 13, wherein the support includes channels of differing depths for receiving the first and second pluralities of parallel fluid conduits and enforcing the perpendicular, interwoven configuration.

15. A fluid transport and distribution manifold comprising:
 a support;
 a first plurality of parallel fluid conduits passing through the support;
 a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits; and
 integral with the support, a first plurality of connectable ports, each of the first connectable ports affording fluid access to a free end of one of the first plurality of parallel fluid conduits.

16. A fluid transport and distribution manifold comprising:
 a support;
 a first plurality of parallel fluid conduits passing through the support;
 a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits; and
 integral with the support, second and third pluralities of connectable ports, each of the second connectable ports affording fluid access to a first end of one of the second plurality of parallel fluid conduits and each of the third connectable ports affording fluid access to a second end of one of the second plurality of parallel fluid conduits.

17. A fluid transport and distribution manifold comprising:
 a support;
 a first plurality of parallel fluid conduits passing through the support; and
 a second plurality of parallel fluid conduits passing through the support perpendicular to, and interwoven with, the first plurality of parallel fluid conduits, at least some of the second plurality of parallel fluid conduits being selectably fluidly connected to one or more of the first plurality of parallel fluid conduits,
 wherein fluid conduits in the first and second pluralities of parallel fluid conduits are interlaced as warp and weft.

18. A method of fluid transport comprising the steps of:
 interweaving first and second pluralities of parallel fluid conduits, the first and second pluralities of parallel fluid conduits being substantially perpendicular to each other, wherein the first and second pluralities of parallel fluid conduits are retained by a rigid frame of a support in the perpendicular, interwoven configuration, and/or the first plurality of parallel fluid conduits terminates at a multiport valve head;
 fluidly connecting each of at least some of the second plurality of parallel fluid conduits to one or more of the first plurality of parallel fluid conduits; and
 causing fluid to flow from at least some of the first plurality of parallel fluid conduits into at least some of the second plurality of parallel fluid conduits to which they are fluidly connected.

19. The method of claim 18, wherein the fluid connections are permanent.

20. The method of claim 18, wherein the fluid connections are adjustable and valved.

* * * * *